US012617991B2

(12) United States Patent　　　(10) Patent No.:　US 12,617,991 B2
Nomura et al.　　　　　　　　　　(45) Date of Patent:　　　May 5, 2026

(54) MICROCAPSULE FOR LATENT HEAT STORAGE MATERIALS, METHOD FOR PRODUCING SAME, POWDER CONTAINING MICROCAPSULES FOR LATENT HEAT STORAGE MATERIALS, AND HEAT STORAGE DEVICE COMPRISING SAID POWDER

(71) Applicant: National University Corporation Hokkaido University, Hokkaido (JP)

(72) Inventors: Takahiro Nomura, Hokkaido (JP); Takahiro Kawaguchi, Hokkaido (JP); Hiroki Sakai, Hokkaido (JP); Shunsuke Cho, Hokkaido (JP); Kohei Kashiyama, Hokkaido (JP); Kenji Sato, Tokyo (JP); Kazuyuki Miya, Ibaraki (JP); Yoshitaka Shibuya, Ibaraki (JP)

(73) Assignee: National University Corporation Hokkaido University, Hokkaido (JP)

( * ) Notice: Subject to any disclaimer, the term of this patent is extended or adjusted under 35 U.S.C. 154(b) by 1109 days.

(21) Appl. No.: 17/636,349

(22) PCT Filed: Aug. 20, 2020

(86) PCT No.: PCT/JP2020/031517
§ 371 (c)(1),
(2) Date: Feb. 17, 2022

(87) PCT Pub. No.: WO2021/039599
PCT Pub. Date: Mar. 4, 2021

(65) Prior Publication Data
US 2022/0298401 A1　　　Sep. 22, 2022

(30) Foreign Application Priority Data
Aug. 23, 2019　　(JP) ................................. 2019-153237

(51) Int. Cl.
*C09K 5/06*　　　　　(2006.01)
*B22F 1/00*　　　　　(2022.01)
*B22F 1/17*　　　　　(2022.01)

(52) U.S. Cl.
CPC ................ *C09K 5/063* (2013.01); *B22F 1/09* (2022.01); *B22F 1/17* (2022.01)

(58) Field of Classification Search
CPC . C09K 5/06; C09K 5/063; C09K 5/08; C09K 5/14
See application file for complete search history.

(56) References Cited

U.S. PATENT DOCUMENTS

| | | | |
|---|---|---|---|
| 4,657,067 | A | 4/1987 | Rapp et al. |
| 4,873,038 | A | 10/1989 | Rapp et al. |
| 9,208,931 | B2 * | 12/2015 | Kosowsky ............... H01B 1/20 |
| 2009/0169892 | A1 * | 7/2009 | Bazzi ..................... B82Y 30/00 |
| | | | 428/404 |
| 2012/0241694 | A1 * | 9/2012 | Hoehn ................... H10H 20/85 |
| | | | 977/932 |
| 2017/0044415 | A1 | 2/2017 | Akiyama et al. |
| 2018/0085321 | A1 * | 3/2018 | Carlsson ............... C23C 16/403 |
| 2019/0300770 | A1 | 10/2019 | Nomura et al. |
| 2025/0179340 | A1 * | 6/2025 | Nomura .................. B22F 1/16 |

FOREIGN PATENT DOCUMENTS

| | | | | |
|---|---|---|---|---|
| CN | 102746831 | | 10/2012 | |
| CN | 106916573 | A * | 7/2017 | ............. C09K 5/063 |
| CN | 111718692 | A * | 9/2020 | ............... C09K 5/06 |
| JP | S54-26014 | | 9/1979 | |
| JP | H01-113486 | | 5/1989 | |
| JP | 2012-111825 | | 6/2012 | |
| KR | 20190036278 | A * | 4/2019 | ............... C09K 5/06 |
| WO | WO2012/130286 | | 10/2012 | |
| WO | WO2015/162929 | | 10/2015 | |
| WO | WO2017/200021 | | 11/2017 | |

OTHER PUBLICATIONS

Nomura et al. "microencapsulation of eutectic and hyper-eutectic Al—Si alloy as phase change materials for high-temperature thermal energy storage", Solar Energy Materials and Solar Cells, 187, 2018, 255-262. Published online Aug. 23, 2018 (Year: 2018).*
Li et al. "Al-10 wt.%Zn/Al2O3@ZnO microcapsules for high-temperature thermal storage: preparation and thermal properties", Journal of Materials Engineering and Performance, 2022, 31, 2723-2731. Published online Jan. 9, 2022 (Year: 2022).*

(Continued)

*Primary Examiner* — Jane L Stanley
(74) *Attorney, Agent, or Firm* — Cook Alex Ltd.

(57) ABSTRACT

A microcapsule for latent heat storage materials includes a metal core containing Zn and Al and a shell covering the metal core. The shell of the microcapsule includes an oxide film containing Zn and O, and an oxide film containing Al and O adjacent to an inner side of the oxide film containing Zn and O. In the microcapsule, a mass ratio of $ZnAl_2O_4$ is 4% or less. The mass ratio is determined by analyzing the microcapsule by an XRD (X-ray diffractometer) device and subjecting results to quantitative analysis using a RIR (Reference Integrity Ratio) method.

13 Claims, 2 Drawing Sheets

(56)          References Cited

OTHER PUBLICATIONS

Nomura et al. "microencapsulated phase change materials with high heat capacity and high cyclic durability for high-temperature thermal energy storage and transportation", Applied Energy, 188, 2017, 9-18. Published online Dec. 8, 2016 (Year: 2016).*

Li et al. "facile synthesis of Al@Al2O3 microcapsule for high-temperature thermal energy storage", ACS Sustainable Chemistry & Engineering, 2018, 6, 13226-13236. Published online Aug. 29, 2018 (Year: 2018).*

Nomura et al. "Al/Al2O3 core/shell microencapsulated phase change material for high-temperature applications", Solar Energy Materials and Solar Cells, 193, 2019, 281-286. Published online Jan. 25, 2019 (Year: 2019).*

Fan et al. "monocrystalline spinel nanotube fabrication based on the Kirkendall effect", Nature Materials Letters, vol. 5, 2006, 627-631. Published Jul. 2, 2006 (Year: 2006).*

Xu et al. "Al/Al2O3 form-stable phase change material for high temperature thermal energy storage", Energy Procedia, 105, 2017, 4328-4333. Published May 2017 (Year: 2017).*

Wei et al. "preparation and thermal performances of microencapsulated phase change materials with nano-Al2O3-doped shell", Journal of Thermal Analysis and Calorimetry, 2019, 138, 233-241. Published online Apr. 8, 2019 (Year: 2019).*

Sakai et al. "large supercooling of Al—Si alloy in microcapsule composed of Al2O3 shell", Journal of Energy Storage, 87, 2024, 111261. Published online Apr. 1, 2024 (Year: 2024).*

Kawaguchi et al. "microencapsulation of Zn—Al alloy as a new phase change material for middle-high-temperature thermal energy storage applications", Applied Energy, 276, 2020, 115487. Published online Jul. 23, 2020. (Year: 2020).*

Costa et al., "a review of metallic materials for latent heat thermal energy storage: thermophysical properties, applications, and challenges", Renewable and Sustainable Energy Reviews, 154, 2022, 111812. Published online Nov. 4, 2021 (Year: 2021).*

Li et al., "preparation and properties of Al/Al2O3 core-shell microencapsulated phase change material", Journal of Alloys and Compounds, 888, 2021, 161606. Published online Aug. 18, 2021 (Year: 2021).*

Kawaguchi et al., "development of core-shell type microencapsulated phase change material with Zn—30 mass% Al alloy and its shell formation", Journal of Energy Storage, 55, 2022, 105577. Published online Sep. 5, 2022. (Year: 2022).*

Kawaguchi et al., "microencapsulation of Zn-10 mass% Al alloy phase change material via dry synthesis method", Chemical Engineering Journal, 498, 2024, 154782. Published online Aug. 17, 2024. (Year: 2024).*

Clarivate Analytics machine translation of CN 106916573 A to Yang et al., published Jul. 4, 2017 (Year: 2017).*

Clarivate Analytics machine translation of CN 111718692 A to Ma et al., published Sep. 29, 2020 (Year: 2020).*

Clarivate Analytics machine translation of KR 20190036278 A to Jeong et al., published Apr. 4, 2019 (Year: 2019).*

International Search Report (with English translation) and Written Opinion, counterpart International App. No. PCT/JP2020/031517 (Nov. 2, 2020) (10 pages).

Risueno, E. et al., Zinc-rich eutectic alloys for high energy density latent heat storage applications, Journal of Alloys and Compound 705 pp. 714-721 (2017).

International Preliminary Report on Patentability, counterpart International App. No. PCT/JP2020/031517 (Feb. 17, 2022) (5 pages) (translated).

Wu et al., *A review on high-temperature thermochemical energy storage based on metal oxides redox cycle*, Energy Conversion and Management, No. 168, 421-453 (2018).

* cited by examiner

Example 1 ： 50K min⁻¹, 800 ℃

Example 2 ： 10K min⁻¹, 800 ℃

Com. 1 ： 50K min⁻¹, 900 ℃

Example 4 ： 50K min⁻¹, 900 ℃

MICROCAPSULE FOR LATENT HEAT STORAGE MATERIALS, METHOD FOR PRODUCING SAME, POWDER CONTAINING MICROCAPSULES FOR LATENT HEAT STORAGE MATERIALS, AND HEAT STORAGE DEVICE COMPRISING SAID POWDER

The present application is a U.S. National Stage of PCT International Patent Application No. PCT/JP2020/031517, filed Aug. 20, 2020, which claims priority to JP Application No. 2019-153237, filed Aug. 23, 2019, both of which are hereby incorporated herein by reference.

FIELD OF THE INVENTION

The present invention relates to a microcapsule for latent heat storage materials, a method for producing the same, a powder containing microcapsules for latent heat storage materials, and a heat storage device comprising said powder.

BACKGROUND OF THE INVENTION

Techniques for storing heat include, for example, sensible heat storage and latent heat storage. The sensible heat storage uses a temperature change of a heat storage material. On the other hand, the latent heat storage uses a phase change of the heat storage material, for example, from a solid phase to a liquid phase.

Patent Literature 1 discloses a latent heat storage body, wherein the latent heat storage body comprises core particles of an Al-Si alloy and a shell of Al oxide film covering the core particles. With regard to the shell, Patent Literature 1 discloses that the core particles are subjected to a chemical coating treatment, and further to a thermal oxidation treatment, thereby enabling an oxide film to be formed.

Patent Literature 2 discloses that core particles of a latent heat storage body are made of an alloy of at least one alloy component A selected from the following group A and at least one alloy component B selected from the following group B (A-B alloy):

Group A: Ca, Si, Bi, Mg, Sb, In, Sn, Al, Ti, Cr, Mn, Fe, Co, Ni, Cu, Zn, Pd, Ag, Au, Pb; and Group B: Al, Cr, Mn, Si, Mg, Co, Ni.

Furthermore, Patent Literature 2 discloses that the following relationship is satisfied:

$$\Delta G_A{}^0 \geq \Delta G_B{}^0$$

($\Delta G_A{}^0$): standard free energy of oxide formation of the alloy component A; and ($\Delta G_B{}^0$): standard free energy of oxide formation of the alloy component B Non-Patent Literature 1 discloses the following three alloys:

$Zn_{84}Al_{8.7}Mg_{7.3}$;

$Zn_{88.7}Al_{11.3}$; and $Zn_{92.2}Mg_{7.8}$, in which each number represents at. %.

Further, Non-Patent Literature 1 discloses that these alloys were evaluated for their potential to be used as phase changing materials for latent heat storage. Furthermore, this literature discloses that those alloys have melting points of 344° C., 382° C., and 371° C., respectively, and heat of fusion of 132 $Jg^{-1}$, 118 $Jg^{-1}$, and 106 $Jg^{-1}$, respectively.

CITATION LIST

Patent Literatures

[Patent Literature 1] WO 2015/162929 A1
[Patent Literature 2] WO 2017/200021 A1

Non-Patent Literature

[Non-Patent Literature 1] E. Risue et al., "Zinc-rich eutectic alloys for high energy density latent heat storage applications", Journal of Alloys and Compounds 705 (2017), p. 714-721

SUMMARY OF THE INVENTION

Technical Problem

For example, the present inventors have considered that the core-shell type latent heat storage body as described above is used for temperature control of an automobile exhaust gas. The automobile exhaust gas has a wide temperature range, for example, about 200° C. at the time of idling and about 800° C. at the time of full load operation. An exhaust system of an automobile is equipped with an exhaust purification catalyst. However, an excessively high temperature of the exhaust gas may cause decreased and/or deteriorated performance of the exhaust purification catalyst. Therefore, for the purpose of suppressing an excessive increase in the exhaust gas temperature, it is considered that the latent heat storage body is arranged in the exhaust system of the automobile to exchange heat. On the other hand, an excessively low temperature of the exhaust gas does not lead to sufficient performance of the exhaust purification catalyst. From the above viewpoints, the use of the latent heat storage body having an appropriate operating temperature of about 300 to 550° C. and a good latent heat amount may allow an excessive variation of the exhaust gas temperature of the automobile to be suppressed.

The present invention has been created in view of the above circumstances. In an embodiment, an object of the present invention is to provide a latent heat storage body which has a melting point of about 300 to 550° C. and is difficult to cause leakage of a phase changing material, and a product obtained by applying the body (e.g., powder, a heat storage device, etc.). Further, in another embodiment, an object of the present invention is to provide a method for producing such a latent heat storage body.

Solution to Problem

As a result of intensive studies, the present inventors have found that microcapsules containing a combination of Al and Zn have a suitable melting point and are advantageous in preventing leakage of phase changing materials. The present invention has been completed based on the finding, and is illustrated below:

(Invention 1)

A microcapsule for latent heat storage materials, the microcapsule comprising a metal core containing Zn and Al and a shell covering the metal core, wherein the shell of the microcapsule comprises an oxide film containing Zn and O, and an oxide film containing Al and O adjacent to an inner side of the oxide film containing Zn and O; and wherein, when the microcapsule is analyzed by an XRD (X-ray diffractometer) and results are subjected to quantitative analysis using a RIR (Reference Integrity Ratio) method, a mass ratio of $ZnAl_2O_4$ is 4% or less. (Invention 2)

The microcapsule for latent heat storage materials according to Invention 1, wherein the microcapsule comprises 60 to 95 parts by mass of Zn, and 5 to 40 parts by mass of Al, when the total mass of Al and Zn in the microcapsule is 100 parts by mass. (Invention 3)

The microcapsule for latent heat storage materials according to Invention 1 or 2, wherein the oxide film containing Al and O has an average thickness of 100 to 1000 nm. (Invention 4)

The microcapsule for latent heat storage materials according to any one of Inventions 1 to 3, wherein the oxide film containing Zn and O has an average thickness of 100 to 1000 nm. (Invention 5)

The microcapsule for latent heat storage materials according to any one of Inventions 1 to 4, wherein the microcapsule has a melting point of 300 to 550° C. (Invention 6)

The microcapsule for latent heat storage materials according to any one of Inventions 1 to 5, wherein the microcapsule has a latent heat amount of 0.3 to 1.2 $GJm^{-3}$. (Invention 7)

The microcapsule for latent heat storage materials according to any one of Inventions 1 to 6, wherein a volume expansion coefficient of the core is 5 to 9% during melting of the microcapsule. (Invention 8)

A powder comprising a plurality of the microcapsules for latent heat storage materials according to any one of Inventions 1 to 7. (Invention 9)

The powder according to Invention 8, wherein the powder has an average particle size of 20 to 80 μm. (Invention 10)

The powder according to invention 9, wherein the powder has an average particle size of 20 to 38 μm. (Invention 11)

A heat storage device comprising the powder according to any one of Inventions 8 to 10. (Invention 12)

The heat storage device according to Invention 11, wherein the heat storage device is to be arranged on an outer periphery of an exhaust gas passage of an automobile. (Invention 13)

A method for producing the microcapsule for latent heat storage materials according to any one of Inventions 1 to 7, comprising subjecting Zn—Al alloy particles to a boehmite treatment and an oxidation treatment in this order, wherein the oxidation treatment includes increasing a temperature of the particles to a retention temperature under a condition of a temperature increasing rate of 10° C/min or more, and maintaining the particles at the retention temperature and in an oxygen-containing atmosphere. (Invention 14)

The method according to Invention 13, wherein the retention temperature is 700° C. to 910° C. (Invention 15)

The method according to Invention 13 or 14, wherein the temperature increasing rate to the retention temperature is 30° C/min or more.

Advantageous Effects of Invention

In the microcapsule for latent heat storage materials according to an embodiment of the present invention, the melting point can be easily adjusted in the range of about 300 to 550° C., and the adjustment of the melting point can be achieved by changing a content ratio of Al and Zn. Moreover, the phase changing materials (Al and Zn) inside the microcapsule is protected by the double oxide film, so that it is difficult for the phase changing material to leak. Furthermore, the mass ratio of $ZnAl_2O_4$ is 4% or less, in other words, the oxide film is uniform and has reduced surface defects. Accordingly, it is difficult for the phase changing materials to leak. Therefore, it is expected that the microcapsule for latent heat storage materials is used for a heat storage device. For example, it is expected that the heat storage device is arranged in an exhaust system for an automobile to stabilize an exhaust gas temperature.

The microcapsule for latent heat storage materials according to an embodiment of the present invention has a melting point of 300 to 550° C. In this case, the microcapsule for latent heat storage materials can store not only the exhaust heat of the automobile but also various unused heat generated in that temperature range.

The microcapsule for latent heat storage materials according to a preferred embodiment of the present invention has a shell with reduced surface defects. According to this, it is difficult for the oxide film that forms the shell to be damaged during repeated use, and it is, therefore, expected that durability will be improved.

In the microcapsule for latent heat storage materials according to a preferred embodiment of the present invention, the surface defects are reduced even if the shell is thinner. Since the shell itself does not contribute to a latent heat storage function, a thinner shell relatively increases a volume of the core. Therefore, the latent heat amount per unit volume of the microcapsule for latent heat storage materials can be increased.

In the microcapsule for latent heat storage materials according to a preferred embodiment of the present invention, a volume expansion coefficient during a phase change from a solid phase to a liquid phase is lower. This leads to difficulty for the oxide film that forms the shell to be damaged during repeated use, and it is, therefore, expected that durability will be improved.

DETAILED DESCRIPTION OF THE INVENTION

Figure 1:
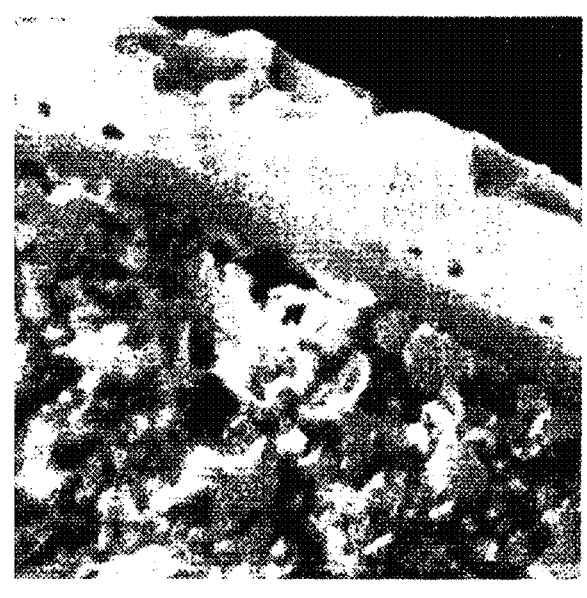
FIG. 1 is an SEM image of a cross section of a microcapsule for latent heat storage materials according to Example 3.

<1. Microcapsule for Latent Heat Storage Materials>
(1-1. Overall Composition of Microcapsule)

In an embodiment, the microcapsule for latent heat storage materials according to the present invention contains Al and Zn. A melting point of Al is 660.3° C., and a melting point of Zn is 419.5° C. Therefore, the melting point of the microcapsule can be decreased as the ratio of Zn to be combined with Al is increased. Further, even if the melting point is decreased, on the other hand, the microcapsule containing Al and Zn has a feature of an increased latent heat amount per volume during melting. Further, since Al has a higher volume expansion coefficient during melting, the volume expansion during a phase change from a solid phase to a liquid phase can be alleviated by adding Zn having a lower volume expansion coefficient during melting. However, if the ratio of Zn added to Al becomes too high, an AlOOH film as a precursor for the aluminum oxide film is not sufficiently formed during the boehmite treatment. It is believed that this makes it difficult to form a sufficient aluminum oxide film in the subsequent oxidation treatment. Therefore, there is an appropriate content ratio of Al and Zn.

Therefore, in the microcapsule for latent heat storage materials according to a preferred embodiment of the present invention, the Zn content is 60 to 95 parts by mass and the Al content is 5 to 40 parts by mass (here, the total mass of Al and Zn in the microcapsule is 100 parts by mass). In the microcapsule for latent heat storage materials according to a more preferable embodiment of the present invention, the Zn content is 60 to 90 parts by mass and the Al content is 10 to 40 parts by mass (here, the total mass of Al and Zn in the microcapsule is 100 parts by mass). In the microcapsule for latent heat storage materials according to an even more preferable embodiment of the present invention, the Zn content is 70 to 80 parts by mass and the Al content is 20 to 30 parts by mass (here, the total mass of Al and Zn in the microcapsule is 100 parts by mass).

Here, when the total mass of Al and Zn in the microcapsule is 100 parts by mass, each part by mass of Al and Zn refers to a value based on the total mass of Al atoms and Zn atoms contained in both a metal core and a shell as described later, and each part by mass of Al and Zn substantially corresponds to each mass ratio of Al atoms and Zn atoms in the raw material powder.

The metal core may contain one or more third elements (e.g., Sn, Bi, Cu, In, Ni, etc.). However, to prevent any unexpected characteristic change, the microcapsule may preferably contain 70% by mass or more of Zn and Al in total, and more preferably 90% by mass or more, and even more preferably 95% by mass or more, based on the total mass of the microcapsule. The microcapsule may be composed only of Zn and Al, excluding oxygen (0) and unavoidable impurities.

(1-2. Structure of Microcapsule)

In an embodiment, the microcapsule for latent heat storage materials according to the present invention has a metal core containing Zn and Al, and a shell covering the metal core.

The metal core contains Zn and Al. In an embodiment, Zn and Al in the metal core can be present in a form of a Zn—Al alloy (e.g., a binary alloy of Zn—Al).

In an embodiment, the metal core can contain Zn and Al in the total amount of 70% by mass or more, and preferably 90% by mass or more, and more preferably 95% by mass or more, in order to prevent any unexpected characteristic change. The metal core may be composed only of Zn and Al, excluding unavoidable impurities.

In an embodiment, the shell has at least two films (e.g., a double film). These films may be comprised of an oxide film containing Zn and O (for example, an oxide film containing ZnO, an oxide film containing Al, Zn and O, or the like) and an oxide film containing Al and O adjacent to an inner side of the oxide film (for example, an oxide film containing $Al_2O_3$, an oxide film containing Al and O and no Zn, or the like). The presence of these films can be detected by analyzing a cross section of the microcapsule with AES (Auger electron spectroscopy). For example, the AES analysis on the shell of the microcapsule detects the oxide film containing Zn and O and the oxide film containing Al and O adjacent to the inner side of the oxide film. The metal core is doubly protected by the shell having the double film.

Therefore, any leakage of phase changing substances such as Zn and Al in the metal core is prevented.

On the other hand, it is preferable that the mass ratio of $ZnAl_2O_4$ is lower. The mass ratio of $ZnAl_2O_4$ is determined by analyzing it with an XRD (X-ray diffractometer) and quantitatively analyzing the results using a RIR (Reference Integrity Ratio) method. More specifically, the microcapsule preferably has a mass ratio of $ZnAl_2O_4$ of 4% or less when the total mass of each crystal phase present in the microcapsule is 100% and quantitative analysis is conducted using the RIR method. Most preferably, the mass ratio of $ZnAl_2O_4$ is as close to 0% as possible. There is a close relationship between the mass ratio of $ZnAl_2O_4$ and an amount of damages (or amount of surface defects) in the oxide films. More specifically, when the mass ratio of $ZnAl_2O_4$ is lower, the oxide films tend to be less damaged. When the oxide film is less damaged, it is expected that the durability during repeated use will be improved.

Here, the RIR (Reference Integrity Ratio) method is to determine the mass ratio of the crystal phase from a ratio of an RIR value and a value of the strongest peak intensity of each crystal phase obtained from XRD (X-ray diffractometer) results. When the microcapsule contains crystal phases A, B, C, . . . , the mass ratio XA of the crystal phase A is calculated by the following equation:

$$X_A = I_A k_A / (I_A k_A + I_B k_B + I_C k_C + \ldots)$$

in which I represent an intensity of the strongest X-ray peak of each crystal phase, and k represents an RIR value of each crystal phase. As the RIR value, the value described in the powder diffraction file (PDF) database from the International Centre for Diffraction Data can be used.

The oxide film containing Al and O can have an average thickness of, for example, 100 to 1000 nm, and more preferably 200 to 500 nm, and typically 200 to 300 nm. The average thickness of the oxide film containing Zn and O can be, for example, 100 to 1000 nm, and typically 500 to 600 nm. This allows most of the Al and Zn forming the microcapsule to exist in the core and to contribute to the latent heat storage function due to the solid-liquid phase change. Therefore, it can provide an advantage that the latent heat amount per volume can be increased.

In the present specification, each average thickness of the films forming the shell (specifically, the average thickness of the oxide film containing Al and O and the average thickness of the oxide film containing Zn and O) is measured by the following methods. The cross section of the microcapsule is observed by SEM, the thickness of each oxide film is measured at three or more points for one microcapsule, and an average value of these measured values is calculated. The same operation is performed for 3 or more microcapsules, and an average value of the oxide film thicknesses of each microcapsule is calculated. An average value of the entire oxide film of these three or more microcapsules is then calculated, and this value is adopted as the average thickness. The type of oxide film can be identified by AES (Auger electron spectroscopy) analysis.

In an embodiment, the microcapsule for latent heat storage materials according to the present invention has such an extremely thin shell on the order of nanometers, while it has a property of having reduced surface defects. Such a microcapsule for latent heat storage materials can be a microcapsule for latent heat storage materials, which has an improved latent heat amount and durability.

(1-3. Melting Point of Microcapsule)

In an embodiment, the microcapsule for latent heat storage materials according to the present invention has a melting point of 300 to 550° C. It should be noted that an appropriate temperature of an exhaust gas purification catalyst for an automobile is about 400° C. Therefore, the melting point of the microcapsule is preferably 350 to 450° C. for the purpose of maintaining the exhaust gas temperature of the automobile near that temperature.

As used herein, the melting point of the microcapsule refers to a melting start temperature when differential scanning calorimetry (DSC) is performed.

(1-4. Latent Heat Amount of Microcapsule)

In an embodiment, the latent heat amount of the microcapsule for latent heat storage materials according to the present invention is 0.3 to 1.2 $GJm^{-3}$, and in a preferred embodiment, the latent heat amount is 0.5 to 1.2 $GJm^{-3}$, and in a more preferred embodiment, the latent heat amount is 0.6 to 1.0 $GJm^{-3}$.

As used herein, the latent heat amount of the microcapsule refers to a change in heat flow associated with a change in solid-liquid phase when differential scanning calorimetry (DSC) is performed.

(1-5. Volume Expansion Coefficient of Microcapsule)

In an embodiment, a core volume expansion coefficient during melting of the microcapsule for latent heat storage materials according to the present invention is 5 to 9%, and preferably 6 to 9%, and more preferably 7 to 9%. A lower volume expansion coefficient when the metal core forming the microcapsule changes from a solid phase to a liquid phase will lead to difficulty for the oxide films that form the shell to be damaged during repeated use. Therefore, it is expected that the durability will be improved.

As used herein, the volume expansion coefficient during melting of the microcapsule for latent heat storage materials refers to a predicted result of software (Factsage), but not the measured value.

(1-6. Size of Microcapsule)

In an embodiment, the microcapsule for latent heat storage materials according to the present invention is provided in the form of powder containing a plurality of microcapsules for latent heat storage materials. In an embodiment, the powder has an average particle size of 20 to 80 μm. The average particle size of the powder is preferably 20 to 50 μm, and more preferably 20 to 38 μm, in terms of forming the shell with reduced surface defects.

The average particle size as used herein (for example, the average particle size of the raw material powder and the average particle size of the powder containing the microcapsules for latent heat storage materials) is a value as measured by a laser diffraction type particle size distribution meter (e.g., HORIBA LA-920). More specifically, a volume distribution of the particle group is measured by the laser diffraction type particle size distribution meter, and a value of cumulative 50 vol.% diameter (D50) is determined to be the average particle size.

(1-7. Use of Microcapsule)

According to an embodiment of the present invention, a heat storage device including a powder containing the microcapsules for latent heat storage materials is provided. In the microcapsule for latent heat storage materials according to an embodiment of the present invention, the melting point can be easily adjusted in the range of about 300 to 550° C., which can be achieved by changing the Zn content. Moreover, in the microcapsule for latent heat storage materials according to the embodiment of the present invention, the latent heat amount is higher. Therefore, the microcapsule for latent heat storage materials can be suitably used for, for example, a latent heat storage device, and the latent heat storage device may preferably be arranged in an exhaust system for an automobile in order to adjust the exhaust gas temperature. In an embodiment, the heat storage device including the powder containing the microcapsules for latent heat storage materials can be arranged on an outer periphery of an exhaust gas passage of an automobile. Further, the heat storage device can store not only the exhaust heat of the automobile but also various unused heat generated in the above temperature range.

<2. Method for Producing Microcapsule for Latent Heat Storage Material>

Hereinafter, a method for producing the microcapsule for latent heat storage materials according to the present invention will be illustratively described.

(2-1. Raw Material)

First, Zn—Al binary alloy particles are provided as a raw material. The content ratios of Al and Zn in the Zn—Al binary alloy particles can be appropriately adjusted depending on required characteristics. Typically, the Zn—Al binary alloy particles are provided in the form of powder. In an embodiment, the average particle size of the raw material powder is 20 to 80 μm. In terms of formation of a shell with reduced surface defects, the average particle size of the powder is preferably 20 to 38 μm.

(2-2. Boehmite Treatment)

Then, the raw material Zn—Al binary alloy particles are subjected to a boehmite treatment to form a film. By the boehmite treatment, a precursor of an oxide film that forms the shell can be formed. More particularly, the raw material Zn—Al alloy particles are placed in water at elevated temperature to form a film on the alloy surface. It is preferable that the purity of water is higher. More particularly, distilled water, pure water, deionized water and the like can be used.

For example, the Zn—Al alloy particles can be subjected to the boehmite treatment under conditions of a water temperature of 80 to 100° C. and 3 to 12 hours. The boehmite treatment is preferably carried out with stirring. After the boehmite treatment, the liquid may be allowed to cool to lower the liquid temperature to room temperature. The particles subjected to the boehmite treatment are then collected, filtered by suction, and dried. The reason for drying the particles subjected to the boehmite treatment is to remove excess water on the surfaces of the particles.

(2-3. Oxidation Treatment)

The Zn—Al binary alloy particles subjected to the Boehmite treatment are then subjected to an oxidization treatment. More specifically, a treatment at elevated temperature is carried out in an oxygen-containing atmosphere. By carrying out the oxidation treatment after the boehmite treatment, the shell having the double oxide film with reduced surface defects can be advantageously formed. The oxidation treatment can be carried out, for example, by increasing the temperature to a retention temperature under a condition of a temperature increasing rate of 10° C/min or more, and maintaining the particles under conditions of the retention temperature and an oxygen-containing atmosphere. The oxygen-containing atmosphere may be an atmosphere containing oxygen, for example, an oxygen atmosphere in which oxygen having a purity of 99.5% is fed at a flow rate of 200 mL/min, or an air atmosphere.

An excessively high retention temperature during the oxidation treatment tends to generate surface defects in the shell, and an excessively low retention temperature also tends to generate surface defects. When the surface defects are generated in the shell, the metal components of the metal core tend to leak from the shell, so that the durability of the microcapsule for latent heat storage materials may be reduced. For this reason, the retention temperature of the oxidation treatment is preferably 700° C. to 910° C., and more preferably 750° C. to 850° C., and even more preferably 780° C. to 830° C. This promotes the formation of a reoxidation film. Therefore, even if cracks (cracks develop to form surface defects) are generated in the shell, the surface defects of the shell can be reduced by forming the reoxidation film.

Further, the temperature increasing rate when increasing the temperature to the retention temperature also has a significant effect on characteristics of the microcapsule for the latent heat storage materials. A difference between the melting point of Al-Zn and the oxidation temperature of Al (from the latter half of 500° C. to about 600° C.) is relatively large. Therefore, by increasing the temperature increasing rate, the reoxidation film is formed in the shell at an early stage. This can allow surface defects to be reduced. More specifically, the temperature increasing rate to the retention temperature is preferably 10° C/min or more, and more preferably 30° C/min or more, and even more preferably 50° C/min or more. The upper limit of the temperature increasing rate is not particularly limited, but the temperature increasing rate to the retention temperature may be 200° C/min or less, or 100° C/min or less, or 80° C/min or less. The temperature increasing rate herein is calculated by the following equation: Temperature increasing rate =(retention temperature–heating start temperature)/(time required from heating start to retention temperature).

On the other hand, when the temperature is decreased from the retention temperature, the temperature decreasing rate is not particularly limited, but it may be any rate. For example, the temperature decreasing rate may be –40° C/min to –60° C/min.

The time for maintenance at the retention temperature may be, for example, 30 minutes to 5 hours, and preferably 1 hour to 5 hours. In general, a longer time for maintenance at the retention temperature tends to provide a thicker oxide film on the shell. However, the maintenance at elevated temperature for a long period of time tends to damage the double oxide film. Therefore, when the oxidation treatment is carried out at 850° C. or higher, the time is preferably 2 hours or less, and when the oxidation treatment is carried out at 900° C. or higher, the time is preferably 1.5 hours or less.

EXAMPLES

Hereinafter, Examples of the present invention are described together with Comparative Examples. However, these Examples are provided for better understanding of the present invention and its advantages, and are not intended to limit the present invention.

Examples 1 to 2, 4 and Comparative Examples 1 to 2

1. Preparation of Powder Containing Microcapsules for Latent Heat Storage Materials Each of powders containing microcapsules for latent heat storage materials of Examples 1 to 2 and 4 and Comparative Examples 1 and 2 was prepared by the following procedure.

1-1. Raw Material Powder

First, a Zn—Al binary alloy (Zn-30 mass % Al) powder having a mass ratio of Zn of 70% and a mass ratio of Al of 30% was prepared by a rotary disk atomizing method. The average particle size of the powder was measured using a laser diffraction type particle size distribution meter (Model LA-920 from HORIBA), confirming that it was 20 to 38 μm.

(1-2. Boehmite Treatment)

In a beaker was placed 300 mL of distilled water, and the distilled water was boiled. At this time, it was boiled with stirring at a rotation speed of 500 rpm using a hot stirrer. Three grams of the powder prepared above was added to 300 mL of distilled water boiled at 100° C. A boehmite treatment was then carried out for 3 hours while continuing the stirring. During the boehmite treatment, an amount of water in the beaker was maintained by adding distilled water. After the boehmite treatment, the water in the beaker was allowed to cool to room temperature. The powder was then removed from the beaker, filtered by suction and dried.

(1-3. Oxidation Treatment)

The powder subjected to the boehmite treatment was then placed in a sample pan of TG-DSC (from METTLER TOLEDO, model TGA/DSC³+). The oxidation treatment was then carried out at a flow rate of 200 mL/min while being allowed to stand under the atmospheric conditions shown in Table 1. The temperature increasing rate, retention temperature, retention time, and temperature decreasing rate during the oxidation treatment were as shown in Table 1. The temperature increasing rate and the temperature decreasing rate were calculated according to the following equations. Further, Comparative Example 2 was not subjected to the oxidation treatment.

Temperature increasing rate=(retention temperature–heating start temperature)/(time required from heating start to retention temperature); and Temperature decreasing rate=(200° C.–retention temperature)/(time required to reach 200° C. from retention temperature after start of cooling).

2. Characterization

The following characterization was carried out on the powders containing the microcapsules for the latent heat storage materials according to Examples 1 to 2 and 4 and Comparative Examples 1 and 2 obtained by the above procedure.

(2-1. Cross-Sectional Observation by SEM)

A groove was formed on a surface of a carbon piece with a cutter. Each powder sample containing microcapsules for latent heat storage materials was embedded in that groove. The surface and particles of the carbon piece were scraped by CP (Cross section polisher) (more specifically, by an Ar ion beam) to expose a particle cross section. The particle cross section was etched with Ar ions (etching conditions were as follows: a beam energy of 3000 eV, an ion current of 4.0 μm, a gas pressure of $8.0 \times 10^{-2}$ Pa for 30 seconds). This removed a natural oxide film on an alloy surface in the particle cross section. The particle cross section was then observed by SEM (from JEOL, model JSM-7001FA).

It was confirmed that for the particles according to all examples other than Comparative Examples 1 and 2, a double film (shell) covering a metal core was formed on the particle surface. On the other hand, the particles according to Comparative Example 1 were fused to each other, and it was difficult to perform analysis such as confirming of the presence or absence of the shell. It was confirmed that the particles according to Comparative Example 2 had a single film (shell) covering a metal core on the particle surface.

(2-2. AES (Auger Electron Spectroscopy) Analysis)

After forming the particle cross section by the method described in the previous section "(2-1. Cross-Sectional Observation by SEM)", AES analysis (model JAMP-9500F from JEOL) was carried out.

As a result, in the shells on the surface layers of the particles according to all examples other than Comparative Examples 1 and 2, the oxide film containing Zn and O and the oxide film containing Al and O adjacent to the inner side of the oxide film were detected. Further, in the shell of the surface layer of the particles according to Comparative Example 2, the oxide film containing Al and O (AlOOH film) was detected. The AlOOH film is a film formed in a solid phase state where the volume of the core is not expanded. Therefore, at the moment when the temperature was increased and the core portion was melted, the film of the particles according to Comparative Example 2 was broken. Further, Al and Zn were detected in the metal core of the particles according to all examples, but O was not detected.

(2-3. Surface Observation by SEM (Scanning Electron Microscope))

Figure 2:
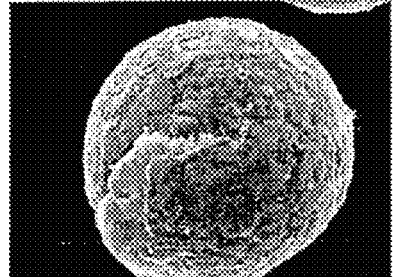
FIG. 2 is SEM images of surfaces of microcapsules for latent heat storage materials according to Examples 1 to 2, 4 and Comparative Example 1.
Figure 2:
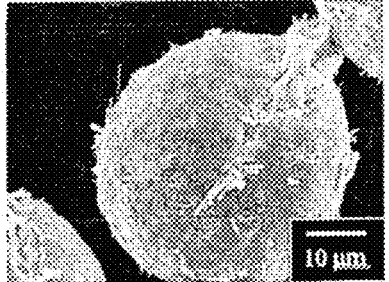
Figure 2:
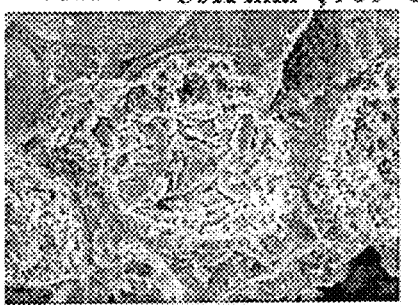
Figure 2:
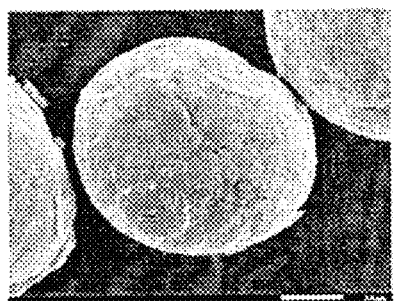

The surface of each microcapsule for latent heat storage materials was observed with SEM (model JSM-7001FA from JEOL). SEM images of particle cross sections according to Examples 1 to 2, 4 and Comparative Example 1 are illustrated in FIG. 2. As can be seen from FIG. 2, a large number of cracks were generated on the surface of the particles of Comparative Example 1 subjected to the oxidation treatment at 900° C. for 3 hours, and fusion of the particles due to the metal components leaking from the cracks was confirmed. On the other hand, traces of cracks in the film were confirmed on the particle surfaces of Examples 1 and 2 which had been subjected to the oxidation treatment at 800° C. for 3 hours. When EDS (energy dispersive X-ray analysis) attached to SEM was performed on the traces of cracks, O, Zn, and Al were detected. Therefore, it is believed that a new oxide film (reoxidation film) was formed by the reoxidation of the metal components leaking from the cracks, and the cracks were closed. Each of the particles according to Examples 1, 2, and 4 retained the spherical shape, and no fusion of the particles was observed. However, as compared with Example 2 in which the temperature increasing rate was 10° C/min and the retention temperature was 800° C., the particles of Example 1 in which the temperature increasing rate was 50° C/min and the retention temperature was 800° C. had cracks further satisfactorily closed by the reoxidation film, and substantially no particles with residual cracks could be confirmed. The reason why the particles according to Example 1 had reduced cracks would be that the temperature increasing rate was higher and the reoxidation reaction rapidly proceeded accordingly.

(2-4. Measurement of Film Thickness)

The cross section of each microcapsule for latent heat storage materials was observed by the method described in "2-1. Cross-Sectional Observation by SEM". The average thickness of the oxide film containing Al and O and the average thickness of the oxide film containing Zn and O were measured and calculated by the methods as described above, respectively. The results were as shown in Table 2. In Comparative Example 1, it was difficult to measure the film thickness. This is because, as described above, a large number of cracks were generated on the surface of the particles, and the metal components leaking from the cracks caused fusion of the particles to each other.

(2-5. XRD (X-Ray Diffraction) Analysis)

Each microcapsule for latent heat storage materials was crushed such that the core/shell structure was destroyed. The crushed sample was analyzed by an X-ray diffractometer (model MiniFlex 600 from Rigaku). The RIR (Region Integrity Ratio) method was then applied to the results, and a quantitative analysis was conducted to determine the mass ratio of $ZnAl_2O_4$. For the RIR value, the value described in the powder diffraction file (PDF) database from the International Centre for Diffraction Data was used (ICSD No. 01-070-8186). The analysis conditions were set as follows:

X-ray source: CuKa ray;

Measurement range: $2\theta = 3°$ to 90°;

Step: 0.01°;

Scan speed: 1.0°/min;

Detector: high-speed one-dimensional detector D/teX Ultra 2;

Tube voltage: 40 kV; and

Tube current: 15 mA.

As a result, as shown in Table 2, the mass ratio of $ZnAl_2O_4$ was 4% or less for the particles according to Examples 1 to 2 and 4. For the particles according to Comparative Example 2, $ZnAl_2O_4$ was not detected because the sample was not subjected to the oxidation treatment.

(2-6. Melting Point)

The melting point of each microcapsule for the latent heat storage materials was determined by differential scanning calorimetry (DSC) (model DSC 823e from METTLER TOLEDO). The results are shown in Table 2. In contrast to Example 1 and the like, in Comparative Example 1, the melting point of the microcapsule for the latent heat storage materials was about 379° C. This would be because the composition of the inner core significantly varied because the inner alloy was exposed and strongly oxidized due to the breakage of the oxide films.

(2-7. Latent Heat Amount)

The latent heat amount of each microcapsule for the latent heat storage materials was determined by differential scanning calorimetry (DSC) (model DSC 823e from METTLER TOLEDO). The results are shown in Table 2.

(2-8. Volume Expansion Ratio)

For the core volume expansion coefficient during melting of the microcapsule for latent heat storage materials, a volume expansion coefficient between a solidus temperature and a liquidus temperature was determined by Factsage (from Research Center of Computational Mechanics, Inc. Ver.7.3; conditions are as described below). The results are shown in Table 2.

Database: FTlite;

Elements: Al, Zn;

Calculated composition: 5-40 wt % Al (at intervals of 5 wt %);

Temperature: 0 to 600° C. (at intervals of 1° C.); and

Pressure: 1 atm.

(2-9. Average Particle Size)

The average particle size of the microcapsules for the latent heat storage materials was measured using a laser diffraction type particle size distribution meter (HORIBA LA-920). The results are shown in Table 2. In Comparative Example 1, it was difficult to measure the average particle size due to the fusion of the particles.

Example 3

1. Preparation of Powder Containing Microcapsules for Latent Heat Storage Materials A raw material powder was subjected to a boehmite treatment and an oxidation treatment under the same conditions as those of Example 1, with the exception that a Zn—Al binary alloy (Zn-40% by mass Al) powder (an average particle size of 20 to 38 μm) having a mass ratio of Zn of 60% and a mass ratio of Al of 40% was used as the raw material powder.

2. Characterization

The powder containing the microcapsules for the latent heat storage materials according to Example 3 obtained by the above procedure was characterized by the same procedure as that of Example 1 as follows:
(2-1. Cross-Sectional Observation by SEM)
It was confirmed that a double film (shell) covering a metal core was formed on the particle surface. FIG. 1 illustrates an SEM image of a particle cross section according to Example 3.
(2-2. AES (Auger Electron Spectroscopy) Analysis)
On the particle surface, an oxide film containing Zn and O and an oxide film containing Al and O adjacent to the inner side of the oxide film were detected. Further, Al and Zn were detected in the metal core, but O was not detected.
(2-3. Surface Observation by SEM (Scanning Electron Microscope))
As with the particles according to Example 1, substantially no particles with residual cracks could be confirmed for the particles according to Example 3.
(2-4. Other Characteristics)
The results were as shown in Table 2.

Comparative Examples 3 to 4

1. Preparation of Powder Containing Microcapsules for Latent Heat Storage Materials Each raw material powder was subjected to a boehmite treatment and an oxidation treatment under the same conditions as those of Example 1, with the exception that one of Zn powder and Al powder (each having an average particle size of 20 to 38 μm) was used as the raw material powder, and the atmosphere, temperature increasing rate, and retention temperature during the oxidation treatment were as shown in Table 1.

2. Characterization

The powders containing the microcapsules for the latent heat storage materials according to Comparative Examples 3 to 4 obtained by the above procedure were characterized by the same procedure as that of Example 1.
(2-1. Cross-Sectional Observation by SEM)
No significant film was confirmed on the surface of the particles according to Comparative Example 3. Further, it was confirmed that the particles according to Comparative Example 4 had a single film (shell) covering a metal core on the particle surface.

(2-2. AES (Auger Electron Spectroscopy) Analysis)
No significant film was confirmed on the surface of the particles according to Comparative Example 3. Further, in the particles according to Comparative Example 4, an oxide film containing Al and O was detected. Either Al or Zn was detected in the metal cores of the particles according to both examples, but O was not detected.
(2-3. Surface Observation by SEM (Scanning Electron Microscope))
No significant film was formed on the particles according to Comparative Example 3. Further, as with the particles according to Example 1, in the particles according to Comparative Example 4, substantially no particles having residual cracks could be confirmed.
(2-4. Other Characteristics)
The results were as shown in Table 2.
Since the core component is either Al or Zn, there is no possibility that $ZnAl_2O_4$ will be formed. Therefore, in Comparative Examples 3 to 4, the analysis by the X-ray diffractometer was not conducted.

Example 5

(1. Preparation of Powder Containing Microcapsules for Latent Heat Storage Materials)

A raw material powder was subjected to a boehmite treatment and an oxidation treatment under the same conditions as those of Example 1, with the exception that a Zn—Al binary alloy (Zn-10% by mass Al) powder (an average particle size of 20 to 38 μm) having a mass ratio of Zn of 90% and a mass ratio of Al of 10% was used as the raw material powder.

2. Characterization

The powder containing the microcapsules for the latent heat storage materials according to Example 5 obtained by the above procedure was characterized by the same procedure as that of Example 1 as follows:
(2-1. Cross-Sectional Observation by SEM)
It was confirmed that a double film (shell) covering a metal core was formed on the particle surface.
(2-2. AES (Auger Electron Spectroscopy) Analysis)
On the particle surface, an oxide film containing Zn and O and an oxide film containing Al and O adjacent to the inner side of the oxide film were detected. Further, Al and Zn were detected in the metal core, but O was not detected.
(2-3. Surface Observation by SEM (Scanning Electron Microscope))
As with the particles according to Example 1, substantially no particles with residual cracks could be confirmed for the particles according to Example 5.
(2-4. Other Characteristics)
The results were as shown in Table 2.

TABLE 1

| | Raw Material Powder | | | Oxidation Treatment Conditions | | | |
|---|---|---|---|---|---|---|---|
| | Powder Composition | Average Particle Size/um | Atmosphere | Temperature Increasing Rate/Kmin$^{-1}$ | Retention Temperature/ ° C. | Retention Time/h | Temperature Decreasing Rate/Kmin$^{-1}$ |
| Example 1 | Zn-30% by mass Al | 20-38 | Pure Oxygen | 50 | 800 | 3 | −50 |
| Example 2 | Zn-30% by mass Al | 20-38 | Pure Oxygen | 10 | 800 | 3 | −50 |
| Comp. 1 | Zn-30% by mass Al | 20-38 | Pure Oxygen | 50 | 900 | 3 | −50 |
| Example 3 | Zn-40% by mass Al | 20-38 | Pure Oxygen | 50 | 800 | 3 | −50 |

TABLE 1-continued

| | Raw Material Powder | | | Oxidation Treatment Conditions | | | |
|---|---|---|---|---|---|---|---|
| | Powder Composition | Average Particle Size/um | Atmosphere | Temperature Increasing Rate/Kmin$^{-1}$ | Retention Temperature/ °C. | Retention Time/h | Temperature Decreasing Rate/Kmin$^{-1}$ |
| Example 4 | Zn-30% by mass Al | 20-38 | Pure Oxygen | 50 | 900 | 0.92 | −50 |
| Comp. 2 | Zn-30% by mass Al | 20-38 | — | — | — | — | — |
| Comp. 3 | 100% by mass Zn | 20-38 | Air | 10 | 800 | 3 | −50 |
| Comp. 4 | 100% by mass Al | 20-38 | Pure Oxygen | 10 | 1100 | 3 | −50 |
| Example 5 | Zn-10% by mass Al | 20-38 | Pure Oxygen | 50 | 800 | 3 | −50 |

TABLE 2

Characteristics of Microcapsules

| | Melting Point/° C. | Latent Heat Amount/GJm$^{-3}$ | Core Volume Expansion Coefficient/ % | Average Particle Size/ um | ZnAl$_2$O$_4$ Mass Ratio/% | Average Thickness of Oxide Film Containing Al and O/nm | Average Thickness of Oxide Film Containing Zn and O/nm |
|---|---|---|---|---|---|---|---|
| Example 1 | 437 | 0.67 | 8.2 | 40 | 0.7 | 250 | 550 |
| Example 2 | 437 | 0.56 | 8.2 | 43 | 0.6 | 250 | 550 |
| Comp. 1 | 379 | 0.23 | 8.2 | — | 4.1 | — | — |
| Example 3 | 450 | 0.97 | 8.4 | 46 | 2.1 | 200 | 550 |
| Example 4 | 437 | 0.49 | 8.2 | 45 | 3.5 | 400 | 500 |
| Comp. 2 | 437 | 0.68 | 8.2 | 37 | — | 250 | — |
| Comp. 3 | 420 | — | — | — | — | — | — |
| Comp. 4 | 660 | 1 | — | — | — | 1000 | — |
| Example 5 | 379 | 0.59 | 6.6 | 47 | 1.3 | 200 | 500 |

The invention claimed is:

1. A microcapsule for latent heat storage materials, the microcapsule comprising a metal core containing Zn and Al and a shell covering the metal core, wherein the shell of the microcapsule comprises an oxide film containing Zn and O, and an oxide film containing Al and O adjacent to an inner side of the oxide film containing Zn and O;

wherein the microcapsule comprises 60 to 95 parts by mass of Zn, and 5 to 40 parts by mass of Al, when the total mass of Al and Zn in the microcapsule is 100 parts by mass; and wherein, when the microcapsule is analyzed by an XRD (X-ray diffractometer) and results are subjected to quantitative analysis using a RIR (Reference Integrity Ratio) method, a mass ratio of ZnAl$_2$O$_4$ in the microcapsule is 4% or less.

2. The microcapsule for latent heat storage materials according to claim 1, wherein the oxide film containing Al and O has an average thickness of 100 to 1000 nm.

3. The microcapsule for latent heat storage materials according to claim 1, wherein the oxide film containing Zn and O has an average thickness of 100 to 1000 nm.

4. The microcapsule for latent heat storage materials according to claim 1, wherein the core has a melting point of 300 to 550° C.

5. The microcapsule for latent heat storage materials according to claim 1, wherein the microcapsule has a latent heat amount of 0.3 to 1.2 GJm$^{-3}$.

6. The microcapsule for latent heat storage materials according to claim 1, wherein a volume expansion coefficient of the metal core is 5 to 9% during melting of the microcapsule.

7. A powder comprising a plurality of the microcapsules for latent heat storage materials according to claim 1.

8. The powder according to claim 7, wherein the powder has an average particle size of 20 to 80 µm.

9. The powder according to claim 8, wherein the powder has an average particle size of 20 to 38 µm.

10. A heat storage device comprising the powder according to claim 7.

11. An exhaust gas passage of an automobile comprising, on an outer periphery thereof, the heat storage device of claim 10.

12. A method for producing the microcapsule for latent heat storage materials according to claim 1, comprising:

providing Zn-Al alloy particles, subjecting the Zn-Al alloy particles to a boehmite treatment and an oxidation treatment in this order, wherein the oxidation treatment includes increasing a temperature of the particles to a retention temperature under a condition of a temperature increasing rate of 10° C./min or more, and maintaining the particles at the retention temperature and in an oxygen-containing atmosphere, wherein the retention temperature is 700° C. to 830° C.

13. The method according to claim 12, wherein the temperature increasing rate to the retention temperature is 30° C./min or more.

* * * * *